United States Patent [19]

Uitermarkt

[11] Patent Number: 4,656,875
[45] Date of Patent: Apr. 14, 1987

[54] METHOD AND DEVICE FOR MEASURING THE DEFORMATION OF A ROTATING SHAFT

[75] Inventor: Rombartus W. Uitermarkt, Alblasserdam, Netherlands

[73] Assignee: 501 Techno Diagnosis B.V., Vlaar Dingen, Netherlands

[21] Appl. No.: 752,188
[22] PCT Filed: Oct. 31, 1984
[86] PCT No.: PCT/NL84/00037
 § 371 Date: Jul. 1, 1985
 § 102(e) Date: Jul. 1, 1985
[87] PCT Pub. No.: WO85/02011
 PCT Pub. Date: May 9, 1985

[30] Foreign Application Priority Data

Oct. 31, 1983 [NL] Netherlands ............... 8303745

[51] Int. Cl.$^4$ ............... G01L 3/10; G01L 25/00
[52] U.S. Cl. ............... 73/862.35; 73/1 R; 73/1 C; 73/862.49
[58] Field of Search ............ 73/1 R, 1 B, 1 C, 862.49, 73/862.67, 862.35, 765, 766, 769, 771, 773; 324/130; 177/50

[56] References Cited

U.S. PATENT DOCUMENTS

| 3,134,279 | 5/1964 | Sims et al. | |
|---|---|---|---|
| 3,234,787 | 2/1966 | Ruge . | |
| 3,535,637 | 10/1970 | Guransson | 73/1 R |
| 3,759,093 | 9/1973 | Farr . | |
| 3,797,305 | 3/1974 | Haskell . | |
| 3,850,030 | 11/1974 | Adler . | |
| 3,877,300 | 4/1975 | Ginns | 73/1 R |
| 4,535,854 | 8/1985 | Gard et al. | 177/50 X |

FOREIGN PATENT DOCUMENTS 2657843 6/1978 Fed. Rep. of Germany ... 73/862.35
2077537 12/1981 United Kingdom .

OTHER PUBLICATIONS

Suzuki et al., "Measuring Shaft Torque During . . . Pump Turbines", Water Power, vol. 23, No. 1, Jun. 1971, pp. 20–25.

Primary Examiner—Charles A. Ruehl
Attorney, Agent, or Firm—John P. Snyder

[57] ABSTRACT

The method and apparatus for deriving a calibrated deformation signal from a signal produced by a strain gauge bridge on a rotating shaft involves two further strain gauge bridges, one which approximates the deformation bridge signal in the absence of torque and the other which approximates the deformation bridge signal in the presence of a known torque. The signals are all processed by the same entities and the calibrated signal is derived from a straight line plot determined by the latter two signals. In addition, an axial loading of the shaft is detected by a further strain gauge. Control of power input and of power consumed is from the calibrated deformation signal and the axial loading signal. The further strain gauges are mounted outside the shaft but in good thermal contacting relation thereto.

12 Claims, 6 Drawing Figures

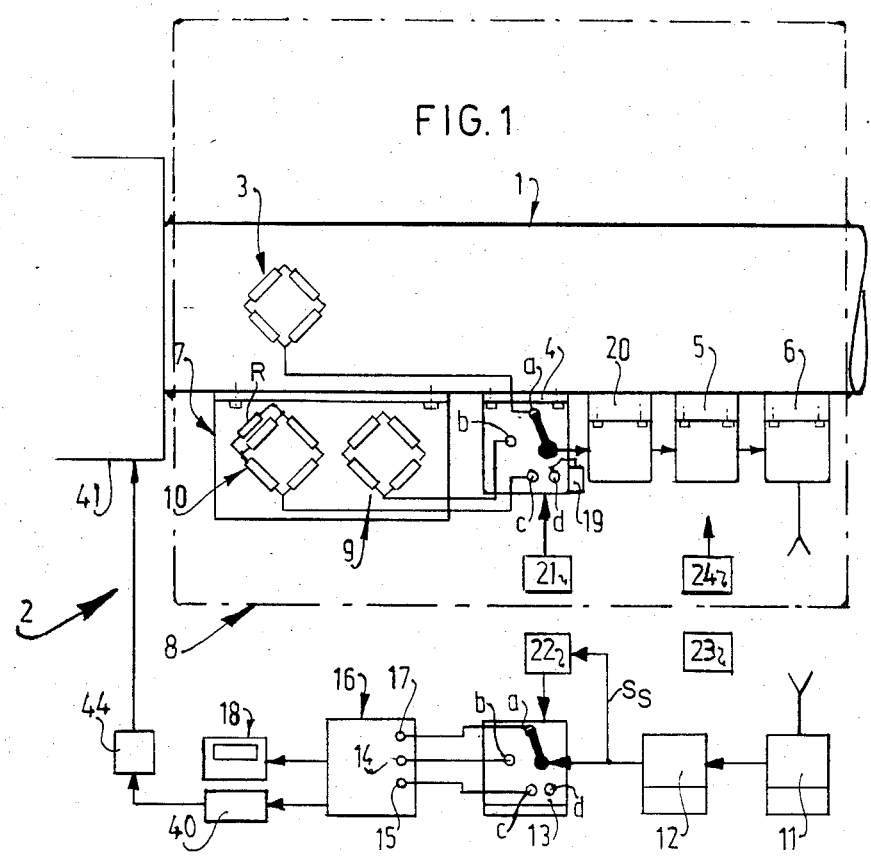
FIG. 1
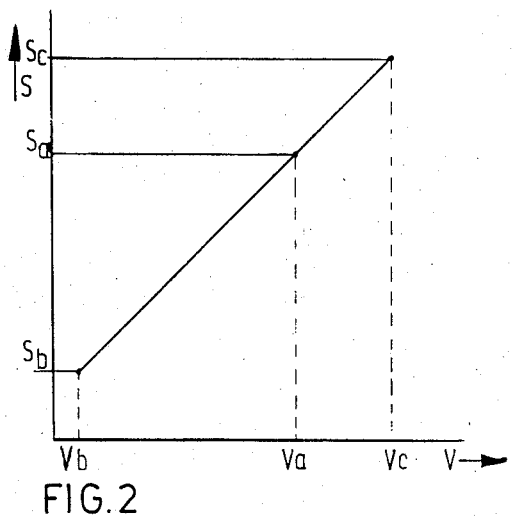
FIG. 2
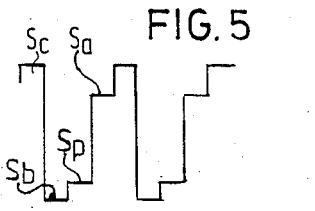
FIG. 3
FIG. 5

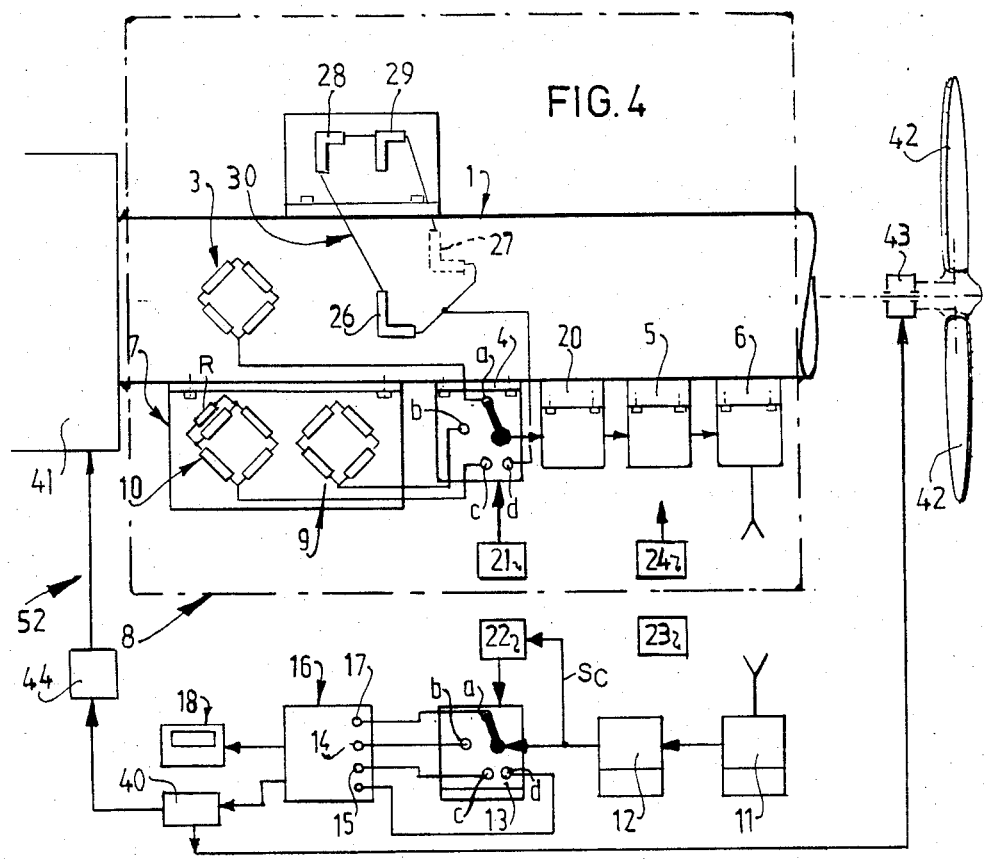
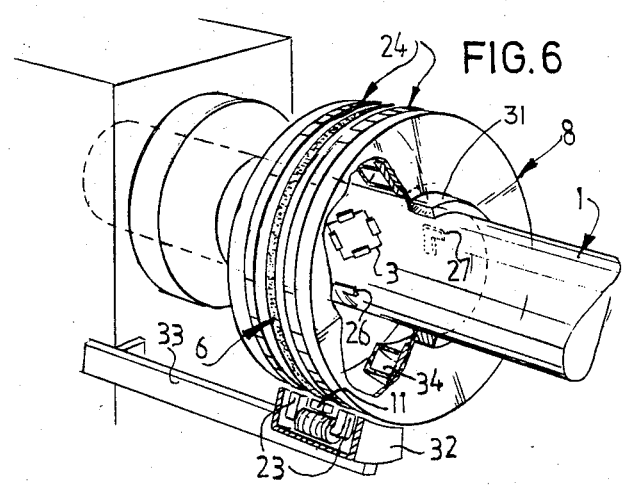

METHOD AND DEVICE FOR MEASURING THE DEFORMATION OF A ROTATING SHAFT

The invention relates to a method of measuring the deformation of a rotating shaft in which calibration means are used for calibrating the measured deformation value.

Such a method is known from U.S. Pat. No. 3,134,279, in which the calibration means are formed by a resistor of known value connected parallel to a strain gauge. These calibration means are temperature sensitive and by this circuitry only the proportionality error of the measuring system is detected.

The invention has for its object to obviate said disadvantage. In the aforesaid patent, a resistor 55 is connected in parallel with the strain gauge 18 through the relay A1. When thus connected, the resistor unbalances the strain gauge bridge by a predetermined amount corresponding to the apparent transmission of a predetermined torque. Consequently, this unbalanced condition is used to calibrate the bridge. As noted, however, the resistor 55 will be temperature sensitive and its predetermined value will thus change, giving a false calibration value. This invention overcomes this disadvantage, in the broadest sense, by measuring the values of three signals, one of which is the indicated signal of the deformation of the shaft, another of which is an approximation of what the indicated signal would be in the absence of deformation of the shaft (hereinafter the signal produced by the zero calibration means) and the third of which is an approximation of what the indicated signal would be if it were unbalanced as in the above patent (hereinafter the signal produced by the proportionality calibration means). A linear plot of these three values allows the calibrated value of the indicated signal to be calculated with great accuracy. When proportionality calibration and zero calibration means pick up signals by means of proportionality calibration and zero calibration bridges arranged on an annular metal carrier connected with the shaft and having the same temperature as the measuring bridge, the measuring value originating from the deformation measuring bridge is compensated for temperature, whilst a calibration signal of the same order of magnitude as the measuring signal is obtained. Moreover, by the zero calibration signal picked up by means of a zero calibration bridge a satisfactory interpolation of the proportionality error between zero calibration and calibration value is possible. Finally, owing to the accurate zero calibration value it is possible to measure a propulsion value in the direction of length, which differs only little from the zero calibration value and which is a measure for the propulsion of, for example, a vessel. The propulsion (propelling pressure) is a very interesting datum for a ship for setting optimum operational conditions of a vessel. The number of revolutions and/or the blade of adjustable propellers can be set in dependence on the measured propelling pressure for different navigation conditions.

The invention will be described more fully hereinafter with reference to a drawing.

The drawing shows schematically in

FIGS. 1 and 4 are similar views but illustrating different embodiments of the invention, FIG. 2 a graph of the deformation measured by the device of FIGS. 1 and 4, FIGS. 3 and 5 a block diagram of the device of FIGS. 1 and 4 respectively, FIG. 6 a perspective view of the device of FIG. 4.

The rotating shaft 1 is provided with pick-up means 3 formed by a measuring bridge of strain gauges known per se. Furthermore, calibration means are rigidly connected with the shaft 1 so that they rotate together with the shaft 1, said calibration means 7 consisting of a carrying ring 8 having zero calibration means 9 not affected by the deformation of the shaft 1 and proportionality calibration means 10 consisting each of a bridge of strain gauges arranged at such a place in the carrying ring 8 that they have the same temperature as the shaft 1. Finally a first alternating switch 4, amplifying means 20, modulation means 5, transmitted means 6, an oscillator 21 and a secondary feed circuit 24 for the electric feed are rigidly connected with the shaft 1 so that they rotate together with the shaft 1.

There are stationary (external with respect to the shaft 1) arranged receiving means 11, demodulation means 12, a second alternating switch 13, a synchronous oscillator 22, a primary feeding circuit 23, calculating means 16 and display means 18. The alternating switches 4 and 13 are synchronously adjustable between an uncalibrated measuring position a, a zero calibration position b, a proportionality measuring position c and a reference voltage measuring position d by means of any known circuit arrangement. This circuit arrangement may comprise a connection 19 of constant voltage $S_d$ exceeding any measuring signal whatsoever. This voltage source 19 is connected to a contact point d of the alternating switch 4. The alternating switch 4 continuously switches in order of succession along the contact points a, b, c, d, a etc. under the control of a master synchronous oscillator 21. Since the slave synchronous oscillator 22 perceives the high $S_d$ signal, it follows by connecting on the contacts d, a, b, c. Then the slave synchronous oscillator 22 has again to perceive the high $S_d$ signal in order to again carry out a through-connection d, a, b, c. Switch 4 changes each time over to contact point b when it perceives a high signal $S_d$ (see FIG. 3), since switch 13 is controlled by synchronous oscillator 22, which is synchronized with oscillator 21 by the signal $S_s$.

In the zero calibration position b of the alternating switching means 4, 13 the zero signal is applied from the zero calibration means 9 to the amplifying means 20, which apply an amplified signal to modulation means 5. The amplified and modulated signal is transmitted by the transmitting means 6, received by the receiving means 11, demodulation by demodulation means 12 and applied, in the zero calibration position b of the alternation switch 13, to the zero calibration signal input 14. The zero calibration signal applied to the calculating means 16 is stored in the memory of the calculating means 16.

When at a different instant, by means of the oscillators 21, 22 the alternating switches 4 and 13 have changed over to their proportionality measuring position c, the proportionality signal of the proportionality calibration means 10 is applied through the same assembly of amplifying means 20, modulation means 5, transmitting means 6, receiving means 11, demodulation means 12, to the proportionality signal input 15 of the calculating means 16, which temporarily store it in a memory concerned.

At a different instant, after a change-over of alternating switches 4 and 13 into an uncalibrated deformation measuring position a, a measuring signal is applied as above to the input terminal 17 of the calculating means 16. The calculation programmed in the calculating means 16 will be explained hereinafter with reference to FIG. 2.

In FIG. 2 is plotted the instantaneous processing behaviour of the assembly 20, 5, 12. Pick-up signals associated with the proportionality calibration value $V_c$ and the zero calibration value $V_b$ arrive at the calculating means 16 as processed signals having the signal magnitude $S_c$ and $S_b$ respectively. From the diagram of FIG. 2 it is apparent that if the value $V_a$ is made to lie on the line connecting the values $V_b$ and $V_c$, its signal magnitude $S_a$ can be calculated by the formula:

$$V_a - V_b = \frac{(S_a - S_b) \cdot (V_c - V_b)}{S_c - S_b}$$

This value calculated in the calculating means 16 is applied to the display means 18, for example, an indicating and/or recording device, a well as to a control device 40 which controls automatically a fuel supply mechanism 44 of a motor 41 driving the shaft 1.

With the aid of the device 52 of FIG. 4 it is possible, for example, to measuring the axial compression of a shaft 1 caused by the propulsion of a ship. The numerals of FIG. 4 equal to those of FIG. 1 designate the same functional means. As shown in FIG. 4, there is added a bridge of hook strain gauges 30 formed by two hook strain gauges 26, 27 arranged on both sides of the shaft and two unloaded, corresponding hook strain gauges 28, 29 arranged on the carrying ring 8. The bridge 30 of hook strain gauges may be connected to contact d of the alternating switch 4 and the contact d of the switch 13 is connected to a terminal of the calculating means 16, as shown.

The slave synchronous oscillator 22 is synchronized, for example, by means of the proportionality calibration signal $S_c$ (FIG. 5). By means of the calibration and zero calibration 10, 9 it is possible to accurately distinguish a propulsion signal $S_p$ corresponding to a compression of the shaft 1 from the zero calibration signal $S_b$.

In FIG. 4 the control device 40 controls particularly in dependence on the torque signal $S_a$ the fuel supply mechanism 44 and controls particularly in dependence on the propulsion signal $S_p$ a propeller blade adjusting mechanism 43 for adjusting the propeller blade angle of the propeller 42 driven by the shaft 1. Said control device 40 comprises a computer for calculating and setting the required fuel amount per unit of time and the required propeller angle for the most efficient operation of the ship.

FIG. 6 shows that the aerial of the transmitting means 6 is located substantially in the middle of the annular carrier 8 and opposite the aerial of the fixed pick-up means 11 arranged on an arm 33 in a casing 32. On both sides of the aerials of the transmitting and receiving means 6 and 11 respectively are arranged the secondary and primary feed windings 24 and 23 respectively for the electric feed of the means arranged on the carrying ring 8.

It is noted that the bridges of strain gauges 30 are fed by alternating voltage in order to avoid thermo-couple effects. For an accurate transmission a frequency-modulated signal is used for transmitting/receiving.

On the carrying rings 8 is arranged a ring 31 coupled with the shaft 1 so as to be in good thermal contact therewith, on which ring 31 are arranged the unloaded strain gauges 28, 29 as well as the bridges 9, 10. An annular cavity 34 is provided in the carrier for accommodating the electric and electronic amplifying, modulation and transmitting means 20, 5 and 6 respectively as well as the alternating switch 4 and the oscillator 21.

It will be appreciated that the means 3 produces a signal which is uncalibrated but is indicative of the torque imposed on the shaft 1. The second strain gauge bridge means 9 produces a signal which approximates the signal which the first strain gauge bridge means 3 would yield in the absence of torque imposed thereon and the third strain gauge bridge means 10 produces a signal which the first means 3 would yield in the presence of a known torque imposed thereon. This known torque is determined by the value of the resistor R associated with one of the strain gauges of the bridge means 10. As will be obvious, the three strain gauge bridge means cannot be constructed so that they are identical and the respective signals from the second and third bridge means cannot precisely represent the values which the first bridge means 3 would yield in the absence of torque and in the presence of a known torque. Moreover, as has been discussed above, the value of the signal produced by the third means 10 is temperature-sensitive because the value of the resistance of the resistor R will vary dependent upon its temperature. To minimize any temperature effect, the two bridge means 9 and 10 are mounted on the support means therefor which is in good thermal contact with the shaft so that they both are subjected to substantially the same temperature to which the first bridge means is subjected. In the calculating means 16, the three values from the three bridge means would rarely, if ever, delineate a straight line. However, by using the values of the second and third means to define a straight line as in FIG. 2, and deriving the value of the first means from this line, an accurate calibrated value for the first means is obtained.

I claim:

1. The method of measuring the torsional deformation of a rotating shaft connecting power input means to power-consuming output means, which comprises the steps of:
  generating a first signal whose value represents the uncalibrated torsional deformation of the shaft;
  generating first and second further signals whose values differ from each other with the value of the first further signal substantially representing the value which the first signal should have in the absence of torsional deformation of the shaft and with the value of the second further signal representing a reference value sufficiently different from that represented by the first further signal as to bracket a calibrated value of the first signal between the values of the further signals;
  sequentially measuring said first signal and said first and second further signals to produce a train of signals having values corresponding to the values of said further signals and the value of said first signal; and
  calculating the calibrated value of the first signal from said train of signals and generating a signal representing such calibrated value of the first signal.

2. The method as defined in claim 1 including the step of generating another signal whose value represents the axial loading on the shaft.

3. The method as defined in claim 1 wherein the calculation of the calibrated value of the first signal is effected by making the calibrated value of the first signal lie on a straight line between the further signals.

4. The method as defined in claim 3 wherein said second further signal has a value representing the value which said first signal should have in the presence of known torsional deformation of the shaft.

5. The method as defined in claim 3 wherein said second further signal has a value representing the value of a fixed voltage reference.

6. The method of calculating the calibrated value of the deformation of a shaft, which is being subjected to torque, from a strain gauge bridge producing an uncalibrated signal representing the deformation of the shaft, which comprises the steps of:

intermittently measuring the value of the uncalibrated signal;

intermittently measuring the value of a signal which approximates the value which the strain gauge bridge should yield in the absence of deformation thereof;

intermittently measuring the value of a signal which approximates the value which the strain gauge bridge should yield in the presence of a known deformation thereof; and calculating the calibrated value of the deformation of the shaft from said intermittently measured values.

7. The method as defined in claim 6 wherein the calibrated value of the deformation of the shaft is calculated along a straight line connecting the values of successive measured values of the signal which approximates the the value which the strain gauge should yield in the presence of a known deformation and the signal which approximates the value which the strain gauge should yield in the absence of deformation thereof.

8. In combination with a shaft, power input means for applying power input to the shaft and power output means for consuming power delivered through the shaft, first strain gauge bridge means oriented on the shaft for producing an output signal indicative of the torque being transmitted through the shaft, support means external to the shaft, a second strain gauge bridge means mounted on said support means for producing a signal approximating the output of the first strain gauge bridge means in the absence of torque loading thereof, a third strain gauge bridge means mounted on said support means for approximating the output of said first strain gauge bridge means in the presence of a known torque loading thereof, means for sequentially and repetitively measuring the values of the signals produced by said first, second and third strain gauge bridge means, and calculating means for relating the measured values of said second and third strain gauge bridge means on a straight line and determining a calibrated value of the signal of said first strain gauge bridge means along such line.

9. In the combination defined in claim 8 including signal processing means for processing all of the signals from said first, second and third strain gauge bridge means in the same fashion for application to said calculating means.

10. In the combination defined in claim 9 wherein said signal processing means includes transmitter means for electromagnetically transmitting said signals, receiving means for electromagnetically receiving said signals and switching means for synchronizing the transmission and reception of said signals.

11. In the combination defined in claim 10 including means for synchronizing said switching means in accord with a further, reference signal.

12. In the combination defined in claim 10 including means for synchronizing said switching means in accord with the value of the signal produced by said third strain gauge bridge means.

* * * * *